United States Patent [19]

Keplinger et al.

[11] Patent Number: 5,345,531
[45] Date of Patent: Sep. 6, 1994

[54] OPTICAL FIBER LIGHTING APPARATUS AND METHOD

[75] Inventors: John S. Keplinger, Stockton, Calif.; Nilesh P. Kacheria, Bombay, India; George Awai, Danville; David R. Borck, Redwood City, both of Calif.

[73] Assignee: Fiberstars, Inc., Fremont, Calif.

[21] Appl. No.: 24,185

[22] Filed: Feb. 26, 1993

[51] Int. Cl.$^5$ .............................. G02B 6/44
[52] U.S. Cl. .................... 385/102; 385/104; 385/106; 385/115; 385/901; 362/32
[58] Field of Search ............. 385/901, 100–114, 385/115–117; 362/32

[56] References Cited

U.S. PATENT DOCUMENTS

| | | | |
|---|---|---|---|
| 3,208,174 | 9/1965 | Wrenshall | 40/130 |
| 4,072,398 | 2/1978 | Larson et al. | 350/96.23 |
| 4,097,119 | 6/1978 | Kumamaru | 350/96.23 |
| 4,128,332 | 12/1978 | Rowe | 355/67 |
| 4,147,406 | 4/1979 | Anderson | 350/96.23 |
| 4,564,261 | 2/1986 | Kojima et al. | 350/96.24 |
| 4,746,190 | 5/1988 | Oestreich et al. | 350/96.23 |
| 4,881,795 | 11/1989 | Cooper | 350/96.23 |
| 4,907,132 | 3/1990 | Parker | 385/901 |
| 4,993,804 | 2/1991 | Mayr et al. | 350/96.23 |
| 5,109,456 | 4/1992 | Sano et al. | 385/100 |
| 5,193,134 | 3/1993 | Pizzorno et al. | 385/105 |
| 5,245,134 | 9/1993 | Vana, Jr. et al. | 174/117 F |
| 5,268,983 | 12/1993 | Tatarka et al. | 385/106 |
| 5,274,725 | 12/1993 | Bottoms, Jr. | 385/105 |

FOREIGN PATENT DOCUMENTS

| | | | |
|---|---|---|---|
| 93998 | 11/1983 | European Pat. Off. | 385/901 |
| WO90118650 | 9/1990 | European Pat. Off. | G02B 6/44 |
| 51-4344 | 1/1976 | Japan | G02B 5/14 |
| 53-130046 | 11/1978 | Japan | G02B 5/14 |
| 55-25920 | 2/1980 | Japan | F21V 5/00 |
| 56-57006 | 5/1981 | Japan | G02B 5/16 |
| 60-177311 | 9/1985 | Japan | G02B 6/44 |
| 61-201001 | 12/1986 | Japan | G02B 6/00 |
| 62-179708 | 11/1987 | Japan | G02B 6/00 |
| 63-2003 | 1/1988 | Japan | 385/901 |
| WO9000699 | 1/1990 | Japan | 385/901 |
| WO8611332 | 5/1986 | United Kingdom | D07B 1/14 |

OTHER PUBLICATIONS

H. G. Haag, et al, High–Density Optical Fibre Cables For the Local Network, International Wire & Cable Symposium Proceedings 1981, pp. 259–269.

*Primary Examiner*—Rodney B. Bovernick
*Assistant Examiner*—John Ngo
*Attorney, Agent, or Firm*—A. C. Smith

[57] ABSTRACT

A composite optical cable for lateral emission of light flux therefrom includes a plural number of sets of transparent optical fibers with each set of fibers assembled into a single cable and with a plurality of single cables assembled in the composite optical cable. The sets of optical fibers forming the single cables may be wound in one direction of rotation to form a spiral of fibers with length, and the single cables may be wound in the opposite direction of rotation to provide the composite optical cable. Selected masking schemes provide apertures at predetermined locations along the single cables through which light flux carried by the cables may be emitted for special lighting effects.

16 Claims, 3 Drawing Sheets

OPTICAL FIBER LIGHTING APPARATUS AND METHOD

FIELD OF THE INVENTION

This invention relates to optical lighting fibers, and more particularly to cables of optical fibers which exhibit lateral emission of light over the length thereof from one or more light sources disposed at one or both ends of the cable.

BACKGROUND OF THE INVENTION

Contemporary lighting techniques for aesthetic lighting or safety illumination applications commonly rely upon lateral leakage of light flux from one or more optical fibers that are optically coupled to a source of light for distributing the light from the surface of the optical fiber or fibers over the length thereof. This produces a pleasing effect of light in any color being distributed in a narrow strip over a substantial distance from the illuminating light source. Glass optical fibers or plastic optical fibers having selected lateral emission properties may be used in such lighting applications that promote flexibility and immunity from electrical shock and that exhibit low-cost, superior characteristics over traditional neon tubes or discrete light sources oriented in a linear array.

Optical fibers for use in such lighting applications commonly include light-scattering schemes within the fibers to enhance lateral emission of light from the fibers, which schemes may include material anomalies such as particles or bubbles distributed in the core material of the fibers to deflect light flux from within tile core material through the surface of the fibers substantially uniformly over the length of the fibers. Schemes of this type tend to exhibit higher levels of light flux laterally emitted from the optical cable closest to the light source or sources disposed near one end or both ends of the fibers, and lower levels of light flux laterally emitted from the fibers a locations remote from the light source. Techniques for graduating the density of light scattering anomalies per unit length of fiber in order to compensate for the non-uniformity of the illumination with distance along the fibers have not been successful for low-cost production of optical fibers of substantial length.

SUMMARY OF THE INVENTION

In accordance with one embodiment of the present invention, a plurality of optical fibers may be twisted or woven together to form a single cable of fibers, and in another embodiment a plurality of single cables may be twisted or woven together to form an optical cable that exhibits a perceived improvement in the uniformity of lateral emission of light flux over the length thereof between light source or light sources which are optically coupled to one or both ends of the cable. It is believed that this continuous bending by twisting or weaving (i.e., convoluting, herein) of the optical fibers into cabled structures provides the equivalent of a continuum of micro bends at which light flux is laterally emitted from a clear fiber. Such micro bends of the fibers with concomitant benefits of perceived improvement in the lateral emission of light flux over the length of the assembled fibers may also be achieved by weaving or otherwise grouping the fibers in alternative embodiments of the present invention.

In another embodiment of the present invention opaque, reflective strips of material such as aluminum foil, or translucent strips, or colored transparent strips may be wound in non-overlapping spiral fashion over single cables or over the entire assembled cable to alter the pattern of emerging light flux in visually contrasting manner, or to color the light flux emerging from the cable in selected patterns at locations along the length thereof. In another embodiment of the present invention multiple strips of such opaque reflective material or of translucent or colored transparent material are wound in spiral manner in opposite rotations around single cables or around the entire assembled cable to provide apertures at regularly-spaced intervals along the length of the cable through which light flux may be laterally emitted. Similar apertures may be formed in another embodiment using a sheath of opaque or translucent or colored transparent material disposed over the assembled fibers and having apertures therein of selected shape through which light flux emerging from the assembled fibers is emitted. Additionally, a plurality of such single cables may be twisted or otherwise oriented together and individually illuminated in a sequence that provides the visual effect of numerous individual light sources emitting light from discrete locations that appear to move along the length of the fiber cable.

DESCRIPTION OF THE PREFERRED EMBODIMENT

Figure 1:
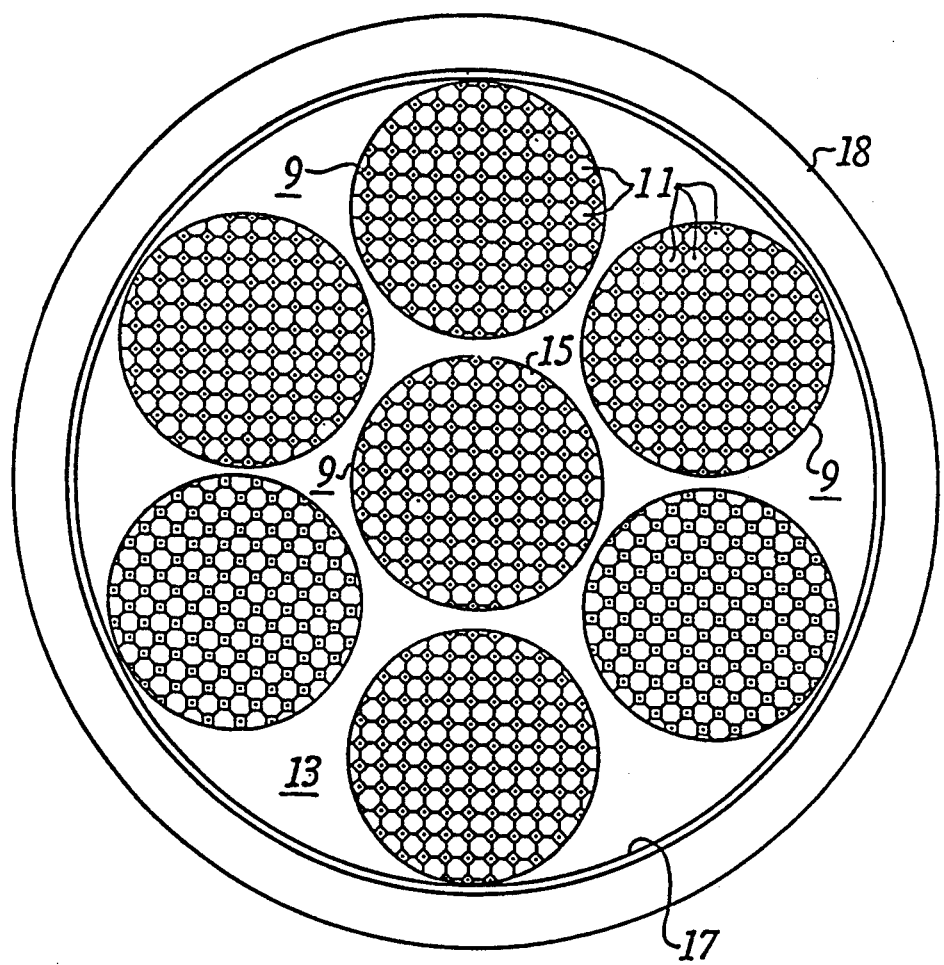
FIG. 1 is a cross-sectional view of a composite cable of optical fiber in accordance with one embodiment of the present invention.
Figure 2:
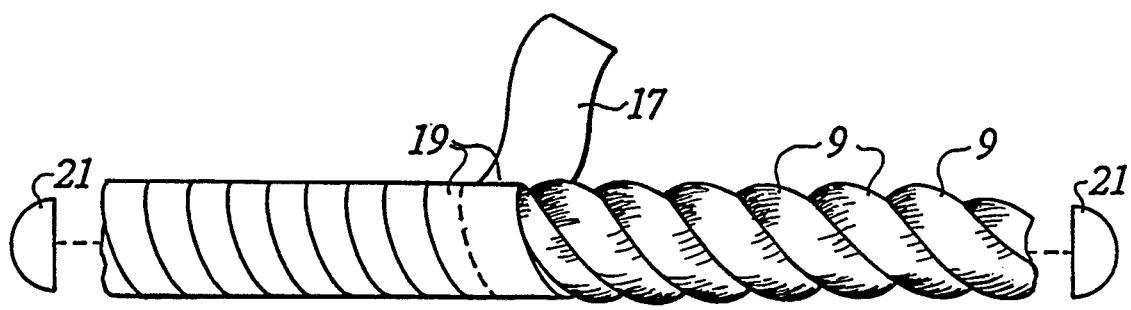
FIG. 2 is a pictorial view of a partial composite cable of FIG. 1 in an optical cable lighting system.

Referring now to the cross-sectional view of FIG. 1, and the pictorial view of FIG. 2, there is shown an optical cable prepared in accordance with one embodiment of the present invention. In this embodiment, each of the single cables 9 is formed of a plural number of two or more individual optical fibers 11 that are formed in conventional manner including a core of a plastic material such as polymethylmethacrylate (PMMA) having an associated index of refraction, with a diameter of about 0.010 to 0.080 inches (typically, 0.030 inches)., and including an outer cladding layer of plastic material having a different index of refraction. The fibers are all twisted or woven or otherwise convoluted together in a continuous manner over the length of the cable. In another embodiment including about 14 individual optical fibers 11 forming a single cable 9, about four of such fibers may form a generally straight, central core of the cable with the remaining individual fibers continuously wrapped around the central core of fibers. Fiber optic cables formed in these ways promote perceived improvement in the lateral emission of light flux from the surface of individual fibers, with total light flux including the light flux that is laterally emitted from the central or core fibers through the surrounding outer or surface-oriented fibers appearing to be more uniformly distributed over the length of the cable when illuminated from both ends. In typical applications, the twist of all such individual fibers (or of the outer fibers over a central core of fibers) may be arranged in one rotational orientation, for example, clockwise lay, with about 3½" to 7½" pitch (i.e., the distance along the cable over which a fiber exhibits one complete wrap), and with negligible tension in individual fibers as they are twisted together.

A plural number of two or more, and typically of about 7 to 12 of such individual cables 9 are then wrapped or twisted together in opposite or counterclockwise rotational orientation (or same one rotational orientation) with about 4½" to 10" pitch to form a composite cable 13 of optical fibers with negligible tension in single cables 9 and in individual fibers 11 as the fibers and the single cables are twisted or wound together. Thus, individual optical fibers 11 in each of the single cables 9 may be oriented near the surface over some portion of one or more pitches. Alternatively, a single cable 15 may be oriented as a straight, central core cable with the remaining single cables 9 twisted around the core cable 15 to remain adjacent the surface of the composite cable 13 over its entire length.

The composite cable 13 may then be wrapped with a layer of clear or colored, transparent tape 17 or other sheath covering that is formed to about 0.001 inch thickness of a polymer material such as "TEDLAR" or "MYLAR", commercially available from DuPont or the like, which can provide heat insulation and, optionally, ultraviolet-ray inhibitors. The sheath covering 17 when formed of a web or strip or tape may be oriented with about 30 to 40 percent of its width overlapping 19 in each wrap or lay of the tape 17 about the composite cable 13. Alternatively, a sheath of such material may be formed by extrusion or other suitable means to provide heat insulation and, optionally, ultraviolet-ray inhibitors. Then, a protective sheath 18 of clear flexible plastic material such as polyvinyl chloride may be co-extruded over the composite cable 13 in conventional manner to enshroud the composite cable 13 in an outer jacket 18 and thereby provide moisture and abrasion protection for the individual fibers that form the composite cable 13. Additionally, ultraviolet-ray inhibitors and biological inhibitors against marine vermin, bacterial and fungal activity may be incorporated into the composition of the clear, flexible material of the outer jacket 18, and colorants or dyes may also be incorporated into the material of the outer jacket 18 to provide desired aesthetic lighting effects.

It is believed that such twisting or weaving or other similar assembling of individual fibers 11 within a single cables 9 and within the composite cable 13 provides sufficiently slight bends in each optical fiber along its length to enhance the lateral emission of light flux from the individual fibers at such bends substantially uniformly over the length of the fiber. Accordingly, such single cables 9, or composite cable 13, with light sources 21 coupled to the ends thereof exhibit improved perceived uniformity of lateral light emission with distance therealong from the end adjacent a light source toward the center of the cable that is most remote from a light source. Additionally, it is believed that the introduction of an insulating sheath 17 between the assembled cable and the outer jacket 18 reduces the deterioration of optical properties of the optic fiber material attributable to heat associated with conventional co-extrusion processes used to form the outer jacket 18 over the assembled cable. In one embodiment, the sheath 17 thus promotes perceived uniformity of laterally emitted light from the assembled cable over lengths to about 200 feet.

In another embodiment of the present invention, a strip or tape 17 may be opaque, reflective material such as aluminum foil or may be translucent or colored transparent material that is wrapped around a single cable 9 or around an entire composite cable in non-overlapping relationship to provide a portion of the surface of a single cable 9 (or of the composite cable 13) that is exposed to permit lateral emission of light from the cable in a continuous, spiraling stripe.

Figure 3A:
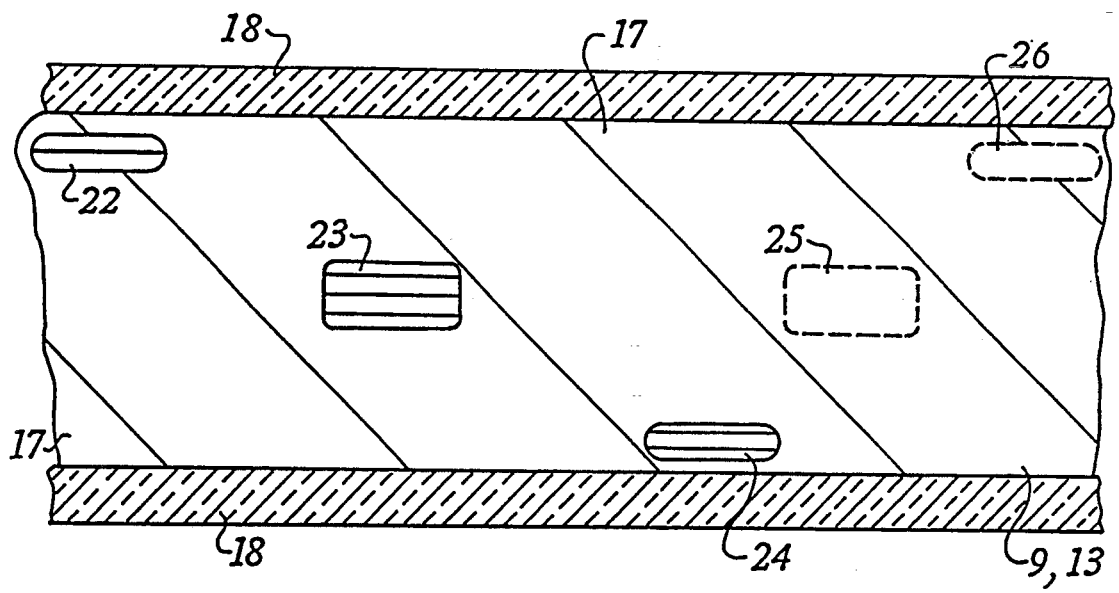
FIGS. 3(a) or 3(b) are partial pictorial views of cables of optical fibers in accordance with other embodiments of the present invention arranged to provide apertures at selected locations along the assembled cable.
Figure 3B:
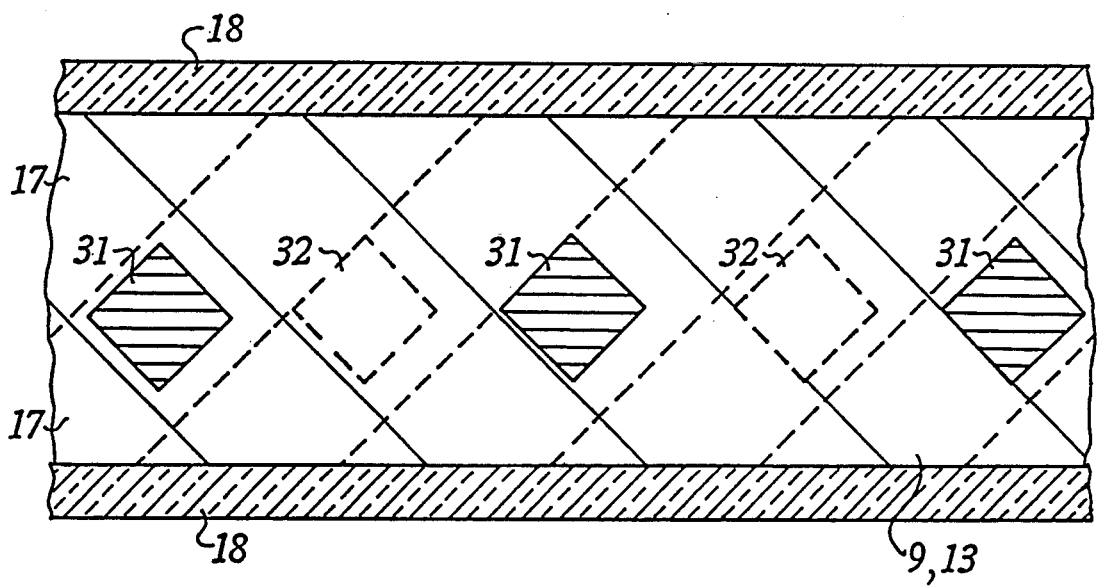

In still another embodiment of the present invention as illustrated in FIG. 3(a), a sheath 17 may be formed about a single cable 9 (or about the composite cable 13) to include apertures 22, 23, 24 (on the front side), 25, 26 (on the rear side) in numerous shapes and spacings about the surface of the cable 9, 13. Alternatively, as illustrated in FIG. 3(b), at least two such strips or tapes may be wound around a single cable, or around the composite cable, in non-overlapping relationship and in opposite directions to form a sheath that exposes a stripe of cable surface that is then intersected by another strip or tape wound in the opposite direction to expose only apertures of surface 31 (on front side) and 32 (on rear side) at selected intervals along a cable through which light may be emitted, thereby to provide the appearance of discrete light sources located at selected intervals along the length of the cable. Of course, a sheath 17 of such materials may also be disposed about each single cable (or about the composite cable 13), and include apertures therein of selected shape and at selected intervals and locations along the cable to provide similar appearance of discrete light sources.

Figure 4:
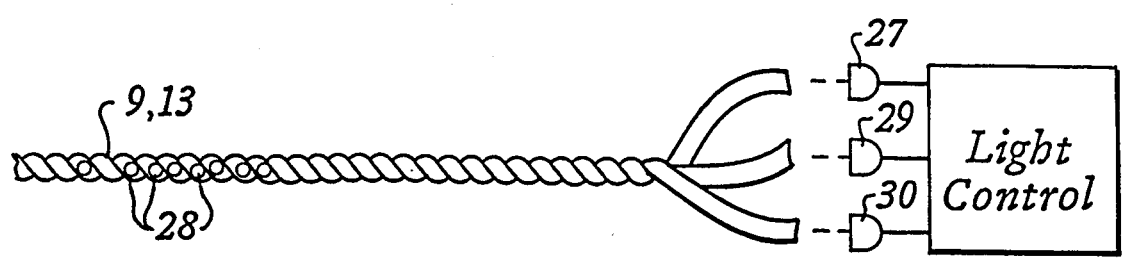
FIG. 4 is a pictorial view of an optical fiber lighting system according to one embodiment for forming the illusion of moving light sources along the length of the cable.

In another embodiment of the present invention, as illustrated in FIG. 4, two or more single cables are each formed with opaque (or translucent or colored transparent) sheaths thereon having apertures 28 positioned at selected intervals of, say, 1 inch along the length with the apertures being formed at substantially the same selected spacing on each cable, but displaced an increment of length from the positions of the apertures on other cables. Thus, the apertures on each cable are displaced incrementally from the apertures on other cables. Light sources 27, 29, 30 are positioned at least on one of the ends of each individual cable and are each sequentially activated (or, are activated in end-end pairs) in one embodiment for pulsed operation in recurring manner to produce the appearance of light sources 'moving' along the length of the cable. In one embodiment with at least 3 cables 9 and associated light source, or end-end paired light sources, the direction of the apparent movement is determined by the order or sequence in which the associated light sources are recurringly activated. The single cables need not be twisted together, but may be retained in adjacent orientation over their length by an outer sheath or jacket of transparent material that retains the single cables in relative positions, and that may also enshroud the cable and include ultraviolet-ray inhibitors to provide protection against environmental elements.

Figure 5:
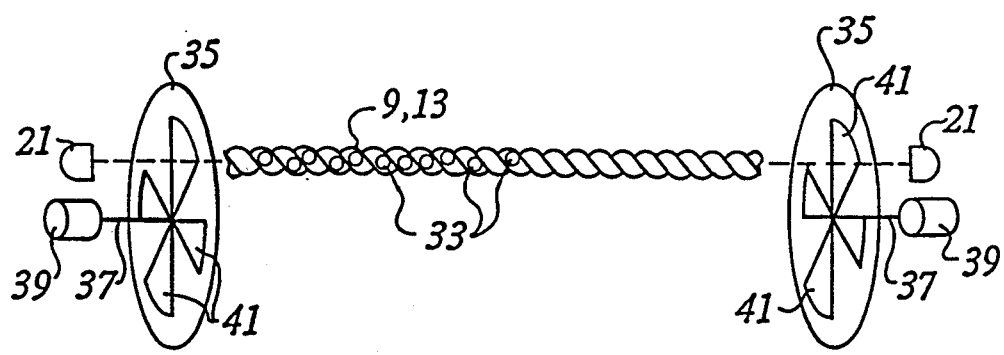
FIG. 5 is a pictorial view of an optical fiber lighting system according to another embodiment for forming the illusion of moving light sources along the length of the cable.

Referring now to the pictorial diagram of FIG. 5, another embodiment of the present invention is illustrated in which an assembled composite cable 9, 13 includes two or more single cables that are twisted together and are covered by a sheath that is extruded or wrapped about the composite cable in a manner as previously described to provide apertures 33 of selected spacings and shapes (e.g. arrows or pointers) along at least a portion of the length of the cable. A shutter wheel 35 that is mounted to rotate about the axis of the shaft 37 of drive motor 39 is disposed in the path of light flux from light source 21 to the end of the cable in order to interrupt the illumination of the cable from the light source 21. Specifically, apertures 41 in the shutter wheel 35 may be separated by a frame of opaque material having a radial extent that may be at least as long as the diameter of the cable 13. Thus, as the wheel 35 rotates, the transition in illuminating flux "sweeps" over the sectional area of the end of the cable. And, as illustrated in the sectional view of FIG. 1, the fibers that are assembled into single cables 9 are confined to specific segments of the total cross sectional area of the cable. Thus, as an aperture 41 in the wheel transmits light flux to the end of the composite cable 13, only a single cable (or cables) in the initially-illuminated segment of the cable end are illuminated, and that single cable (or cables) is illuminated along the length of the composite cable, but dominantly visibly only in the convolutes of twist that appear near the lateral surface of the cable 13 being viewed. Therefore, the same single cable appears illuminated over short lengths that are spaced along the entire length of the composite cable 13. As other single cables 9 that are confined to segments of the sectional area of the composite cable 13 are illuminated through an aperture 41 of the wheel as it rotates across the sectional are of the end of the composite cable, other single cables in spaced locations within the cable end also are illuminated over the entire length of the cable, but the light flux laterally emitted therefrom appears at the surface being viewed to be in short lengths that are spaced apart along the length of the composite cable 13. Thus, as separate single cables 9 are sequentially illuminated, separate spatially-oriented twists of those single cables emit light that is perceived from one viewing surface to 'move' along the composite cable 13. Of course, light sources 21 may be positioned to illuminate both ends of composite cable 13, and a shutter wheel 35 and associated drive motor 39 may be disposed at each end of the cable for synchronized operation to enhance uniformity of illumination from the cable 13 over the entire Length thereof. Also, both ends of the cable 13 may be oriented to be illuminated by the same one light source through one shutter wheel 35. And, shutter wheel 35 may include multiple different color filters in the apertures 41 to provide aesthetically-pleasing visual sensations of different color lights spaced apart and 'moving' along the length of cable 13.

Therefore, the optical fiber cable of the present invention provides enhanced uniformity of lateral emission of light flux over the length of the cable, and also provides enhanced special effects attributable to spatial and time-oriented synchronized illumination of selected segments of the optical fiber cable.

What is claimed is:

1. An optical lighting apparatus comprising:
 a set of a plurality of optical fibers, each fiber including a core of material that is transparent to radiation in a selected waveband, and including a layer of cladding material surrounding the core;
 said set of a plurality of optical fibers being wound in contiguous relationship substantially as a spiral along the length thereof to form a cable, and being adapted to receive light flux at at least one end thereof for laterally emitting light flux received thereby substantially along the length thereof from said end;
 a sheath of light-transmissive material disposed about the cable to retain the set of optical fibers in the contiguous relationship; and
 an outer layer of light-transmissive material disposed to enclose the cable and sheath over the length thereof.

2. The optical lighting apparatus according to claim 1 wherein:
 said sheath includes a substantially continuous layer of light-transmissive material disposed about the cable.

3. The optical lighting apparatus according to claim 1 wherein:
 the core and cladding materials of the optical fibers are plastic; and
 said sheath provides thermal insulation between the optical fibers and said outer layer.

4. A method of forming optical lighting apparatus including a plurality of flexible optical fibers, each including a core of transparent material and a layer of cladding material surrounding the core, the method comprising the steps of:
 substantially winding said set of optical fibers to form spirals along the lengths to provide an optical cable adapted to receive light flux at at least one end thereof for laterally emitting light flux received thereby substantially along the length thereof from said end; and
 enclosing the optical cable in a layer of light-transmissive material over the length thereof.

5. A method of forming optical lighting apparatus including a plurality of flexible optical fibers, each including a core of transparent material and a layer of cladding material surrounding the core, the method comprising the steps of:
 winding subsets of said optical fibers to form individual cables of said optical fibers in spirals with length along the individual cables;
 winding the individual cables to form spirals thereof with length along the assembled cable to form an optical cable adapted to receive light flux at at least one end thereof for laterally emitting light flux received thereby substantially along the length thereof from said end.

6. The method according to claim 5 wherein the step of winding subsets is in one rotation direction; and
 the step of winding the individual cables is in an opposite rotation direction.

7. The method according to claim 5 wherein the step of winding the individual cables includes winding the individual cables about a core of the optical cable to form spirals of individual cables with length along outer regions of the optical cable.

8. Optical lighting apparatus comprising:
 a set of a plurality of optical fibers, each fiber including a core of material that is transparent to radiation in a selected waveband, and including a layer of cladding material surrounding the core;
 said set of a plurality of optical fibers being assembled in contiguous relationship along the length thereof to form a cable, and being adapted to receive light flux at at least one end thereof for laterally emitting light flux received thereby substantially along the length thereof from said end, a sheath of light-transmissive material disposed about the cable to retain the set of optical fibers in the contiguous relationship, said sheath including a layer of web material wound in overlapping relationship about the cable; and an outer layer of light-transmissive material disposed to enclose the cable and sheath over the length thereof.

9. Optical lighting apparatus comprising:

a set of a plurality of optical fibers, each fiber including a core of material that is transparent to radiation in a selected waveband, and including a layer of cladding material surrounding the core;

said set of a plurality of optical fibers being assembled in continuously wound contiguous relationship along the length thereof to form a cable as a substantial spiral of optical fibers with length along the cable;

one subset of said set of a plurality of optical fibers being oriented substantially centrally in the cable with another subset of said set of a plurality of optical fibers being wound around the one subset and forming an outer set of optical fibers;

said set of a plurality of optical fibers being adapted to receive light flux at at least one end thereof for laterally emitting light flux received thereby substantially along the length thereof from said end;

a sheath of light-transmissive material disposed about the cable to retain the set of optical fibers in the contiguous relationship; and an outer layer of light-transmissive material disposed to enclose the cable and sheath over the length thereof.

10. Optical lighting apparatus comprising:

a set of a plurality of optical fibers, each fiber including a core of material that is transparent to radiation in a selected waveband, and including a layer of cladding material surrounding the core;

said set of a plurality of optical fibers being assembled in continuously wound relationship along the length thereof to form a cable as a substantial spiral of optical fibers with length along the cable, said spiral of said set of optical fibers being oriented in one rotation direction;

a plural number of sets of additional optical fibers, each fiber including a core of material that is transparent to radiation in the selected waveband, and including a layer of cladding material surrounding the core, each of said sets of additional optical fibers being assembled in continuously wound relationship forming a substantial spiral with length along the cable oriented in said one rotation direction;

all of said sets of additional optical fibers being assembled in continuously wound relationship forming a substantial spiral with length along the cable oriented in a rotation direction opposite said one rotation direction to form a composite cable of optical fibers adapted to receive light flux at at least one end thereof for laterally emitting light flux received thereby along the length thereof from said end.

11. Optical lighting apparatus comprising:

a set of a plurality of optical fibers, each fiber including a core of material that is transparent to radiation in a selected waveband, and including a layer of cladding material surrounding the core;

said set of a plurality of optical fibers being assembled in continuously wound relationship along the length thereof to form a cable as a substantial spiral of optical fibers with length along the cable;

a central set of a plurality of optical fibers, each including a core of material that is transparent to radiation in the selected waveband, said central set of optical fibers being assembled in continuously wound relationship forming a substantial spiral with length along the cable oriented in one rotation direction;

additional sets of plural optical fibers assembled in continuously wound relationship around said central set for forming substantial spirals with length along the cable oriented in a rotation direction opposite said one rotation direction to form a composite cable;

said composite cable being adapted to receive light flux at at least one end thereof for laterally emitting light flux received thereby substantially along the length thereof from said end;

a sheath of light-transmissive material disposed about the cable to retain the sets of optical fibers in the contiguous relationship; and an outer layer of light-transmissive material disposed to enclose the cable and sheath over the length thereof.

12. Optical lighting apparatus comprising:

a set of a plurality of optical fibers, each fiber including a core of material that is transparent to radiation in a selected waveband, and including a layer of cladding material surrounding the core;

said set of a plurality of optical fibers being assembled in continuously wound relationship along the length thereof to form a cable as a substantial spiral of optical fibers with length in contiguous relationship along the cable;

said set of a plurality of optical fibers being adapted to receive light flux at at least one end thereof for laterally emitting light flux received thereby substantially along the length thereof from said end; and a layer of light-transmissive material disposed about the cable over the length thereof to retain the set of optical fibers in the contiguous relationship.

13. Optical lighting apparatus according to claim 12 wherein:

said layer includes a web of material wound in overlapping relationship about the cable.

14. Optical lighting apparatus according to claim 12 wherein subsets of said plurality of optical fibers are wound about a substantially central core in the cable for forming outer subsets of optical fibers of the cable.

15. Optical lighting apparatus according to claim 12 wherein said subsets of optical fibers are each wound in one rotation direction to form substantial spirals with length along the subsets of optical fibers, all of said subsets of optical fibers being assembled in continuously wound relationship forming a substantial spiral with length along the cable oriented in a rotation direction opposite said one rotation direction to form a composite cable of optical fibers adapted to receive light flux at at least one end thereof for laterally emitting light flux received thereby along the length thereof from said end.

16. The optical lighting apparatus according to claim 12 wherein:

the core and cladding materials of the optical fibers are plastic; and comprising:

an inner layer of light-transmissive materials disposed about the optical fibers for providing thermal insulation between the optical fibers and said layer.

* * * * *

UNITED STATES PATENT AND TRADEMARK OFFICE
CERTIFICATE OF CORRECTION

PATENT NO.   : 5,345,531
DATED        : SEPTEMBER 6, 1994
INVENTOR(S)  : JOHN S. KEPLINGER, ET AL.

It is certified that error appears in the above-indentified patent and that said Letters Patent is hereby corrected as shown below:

Column 8, line 52, delete "12", and insert --14--.

Signed and Sealed this

Twenty-eighth Day of January, 1997

Attest:

BRUCE LEHMAN

*Attesting Officer*     *Commissioner of Patents and Trademarks*